United States Patent
Li

(10) Patent No.: US 12,199,883 B2
(45) Date of Patent: Jan. 14, 2025

(54) STATEFUL SERVICE PROCESSING METHOD AND APPARATUS

(71) Applicant: HUAWEI TECHNOLOGIES CO., LTD., Shenzhen (CN)

(72) Inventor: Junying Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 17/965,112

(22) Filed: Oct. 13, 2022

(65) Prior Publication Data

US 2023/0029796 A1    Feb. 2, 2023

Related U.S. Application Data

(63) Continuation of application No. PCT/CN2020/085433, filed on Apr. 17, 2020.

(51) Int. Cl.
*H04L 47/62* (2022.01)
*H04L 47/625* (2022.01)

(52) U.S. Cl.
CPC ........ *H04L 47/6225* (2013.01); *H04L 47/624* (2013.01); *H04L 47/625* (2013.01)

(58) Field of Classification Search
CPC . H04L 47/6225; H04L 47/624; H04L 47/625; H04L 47/10
See application file for complete search history.

(56) References Cited

U.S. PATENT DOCUMENTS

| 2007/0014246 A1* | 1/2007 | Aloni ...................... H04L 47/10 370/254 |
| 2011/0090920 A1* | 4/2011 | Makineni ................ H04L 69/16 370/463 |
| 2015/0261556 A1* | 9/2015 | Jain .......................... H04L 49/70 718/1 |
| 2020/0120190 A1* | 4/2020 | Cornett ............... G06F 9/45558 |

FOREIGN PATENT DOCUMENTS

| CN | 101123567 A | 2/2008 |
| CN | 101253745 A | 8/2008 |
| CN | 105245387 A | 1/2016 |
| CN | 110138809 A | 8/2019 |

\* cited by examiner

*Primary Examiner* — Habte Mered
(74) *Attorney, Agent, or Firm* — Maier & Maier, PLLC

(57) ABSTRACT

A stateful service processing method and apparatus are provided, related to the field of communication technologies. The method includes: preprocessing a received first packet to obtain a coalescing message of the first packet; coalescing the first packet into a first queue based on the coalescing message of the first packet, where the first queue is used to coalesce packets of a first connection to which the first packet belongs, and the first connection is a connection in which a stateful service is located; when a preset condition is met, processing, based on a context of the first connection, a plurality of packets coalesced in the first queue to obtain a second packet, where the context of the first connection is an updated context obtained after a previous second packet of the first connection is obtained; and transmitting the second packet to the host.

13 Claims, 6 Drawing Sheets

STATEFUL SERVICE PROCESSING METHOD AND APPARATUS

CROSS-REFERENCE TO RELATED APPLICATIONS

This application is a continuation of International Application No. PCT/CN2020/085433, filed on Apr. 17, 2020, the disclosure of which is hereby incorporated by reference in its entirety.

TECHNICAL FIELD

The embodiments relate to the field of communication technologies, a stateful service processing method, and an apparatus.

BACKGROUND

As service types and a data volume in a cloud network continuously increase, execution of a network protocol or a storage protocol has become a compute-intensive operation. When executing a network protocol or a storage protocol, a host occupies a large quantity of center processing unit (CPU) resources. Consequently, heavy CPU load is brought to the host. A smart network interface card (NIC) is a high-performance network access card using a network processor as a core, has a multi-core and multi-thread network processor architecture, and may be used to process various network protocols or storage protocols that are separated from a host, so that CPU load of the host can be greatly reduced. A manner in which related protocol processing is separated from the host and is performed by the smart network interface card may be referred to as offload.

In the conventional technology, for stateful service offload, a process from receiving a packet from a network side by the smart network interface card to transmitting the packet to the host by the smart network interface card usually includes three stages. A stage 1 includes L2 and L3 processing of the packet and is a stateless stage in this case. A stage 2 includes L4 and L4+ processing of the packet. In this case, the packet needs to be processed based on a context of a connection to which the packet belongs. A stage 3 includes editing and DMA command construction of the packet.

The stage 2 is a stateful stage. Packet processing may strictly depend on a context of a same connection. Only after a core or a thread corresponding to a current packet completes updating of the context, can a core or a thread corresponding to a next packet start to perform processing based on an updated context. In addition, a size of each packet is only a maximum transmission unit (MTU). Consequently, processing performance of a single service is low.

SUMMARY

The embodiments may provide a stateful service processing method and apparatus, to improve processing performance of a single service when a network interface card performs stateful service offload.

According to a first aspect, a stateful service processing method is provided, where the method is applied to a network interface card, and the network interface card is connected to a host. For example, the network interface card is a smart network interface card and is connected to the host by using a PCIe bus. The method includes: preprocessing a received first packet to obtain a coalescing message of the first packet, for example, parsing a header of the first packet to obtain an identifier of a first connection to which the first packet belongs; coalescing the first packet into a first queue based on the coalescing message of the first packet, where the first queue is used to coalesce packets of the first connection to which the first packet belongs, for example, the first queue is used to coalesce a plurality of packets of the first connection or a plurality of packets of a same message type of the first connection, and the first connection is a connection in which a stateful service is located; when a preset condition (for example, coalescing duration reaches specified duration or a quantity of coalesced packets reaches a preset threshold) is met, processing, based on a context of the first connection, a plurality of packets coalesced in the first queue to obtain a second packet, where the context of the first connection is an updated context obtained after a previous second packet of the first connection is obtained; and transmitting the second packet to the host.

In the foregoing, the network interface card can preprocess the received first packet to obtain the coalescing message of the first packet, and coalesce, based on the coalescing message, the first packet into the first queue used to coalesce the packets of the first connection. In this case, when the preset condition is met, the plurality of packets coalesced in the first queue are processed based on the context of the first connection, to obtain the second packet. In this way, the network interface card can obtain the context of the first connection only once and process a plurality of packets of the first connection based on the context. Before transmitting the second packet to the host, the network interface card completes editing of a plurality of segments in a coalesced packet based on a requirement of the host, for example, removes a header of each packet. In this way, a final effect is similar to that the host receives a coalesced packet from a network side. Therefore, a requirement for processing performance of the context is greatly lowered, and processing performance of a single stateful service is improved.

In a possible implementation of the first aspect, the coalescing message of the first packet includes at least one of the following: the identifier of the first connection, a function identifier, and metadata. The function identifier may be an identifier of a virtual function that is in the host and that is used to receive the packets of the first connection. The metadata may include a message type of a packet, operation code indicating a message type of a packet, or the like. In the foregoing possible implementation, the network interface card can coalesce, based on a requirement, the first packet into a queue corresponding to the first connection, a queue corresponding to a same message type in the first connection, or the like, thereby improving packet coalescing accuracy.

In a possible implementation of the first aspect, the coalescing the first packet into a first queue based on the coalescing message of the first packet includes: when the coalescing message of the first packet meets a coalescing context of the first queue (for example, the identifier of the first connection, the message type of the packet, and an expected packet number in the coalescing message are all the same as an identifier of the first connection, a message type of a packet, and an expected packet number in the coalescing context), coalescing the first packet to an X chain of the first queue as a coalescing node, where the coalescing context of the first queue indicates a coalescing message of the first queue, for example, the coalescing context of the first queue may include the identifier of the first connection, a message type of a coalesced packet, and a quantity of coalesced packets. It should be noted that if the first queue is empty, the first packet may be coalesced to a Y chain of the first queue, and the coalescing message of the first queue is generated based on the coalescing message of the first packet. For example, the identifier of the first connection and the message type of the packet in the coalescing message of the first packet are extracted as an identifier of a connection and the message type of the coalesced packet in the coalescing context of the first queue. In the foregoing possible implementation, the smart network interface card can coalesce a plurality of packets belonging to a same connection or a plurality of packets of a same message type of a same connection together, thereby improving processing performance of a single service.

In a possible implementation of the first aspect, the coalescing the first packet into a first queue based on the coalescing message of the first packet includes: when the coalescing message of the first packet does not meet the coalescing context of the first queue, coalescing the first packet to the Y chain of the first queue as a basic node, and updating the coalescing context of the first queue based on the coalescing message of the first packet, for example, extracting the identifier of the first connection and the message type of the packet in the coalescing message of the first packet as the identifier of the connection and the message type of the coalesced packet in the coalescing context of the first queue. In the foregoing possible implementation, the network interface card can coalesce a plurality of packets belonging to a same connection or a plurality of packets of a same message type of a same connection together, thereby improving processing performance of a single service. In a possible implementation of the first aspect, the processing a plurality of packets in the first queue includes: editing and chaining a plurality of packets that belong to a same X chain in the first queue. In the foregoing possible implementation, the network interface card can chain the plurality of packets as one packet, process the packet, and transmit a processed packet to the host, thereby improving processing performance of a single service.

In a possible implementation of the first aspect, the preset condition includes any one of the following: the coalescing duration reaches the specified duration, the quantity of coalesced packets reaches the preset threshold, and a volume of coalesced data reaches a preset data volume. In the foregoing possible implementation, flexibility and diversity of packet coalescing can be improved.

In a possible implementation of the first aspect, the method further includes: providing a receive bandwidth for the first queue from an available bus bandwidth (for example, an available bus bandwidth corresponding to the PCIe bus); and correspondingly, the transmitting the second packet to the host includes: transmitting the second packet to the host by using the receive bandwidth. In the foregoing possible implementation, the network interface card can transmit, to the host as one packet, the second packet that is formed by chaining the plurality of packets.

According to a second aspect, a stateful service processing apparatus is provided, where the apparatus is applied to a network interface card, and the network interface card is connected to a host. For example, the network interface card is a smart network interface card and is connected to the host by using a PCIe bus. The apparatus includes: a preprocessor unit, configured to preprocess a received first packet, to obtain a coalescing message of the first packet; a coalescing unit, configured to coalesce the first packet into a first queue based on the coalescing message of the first packet, where the first queue is used to coalesce packets of a first connection to which the first packet belongs, and the first connection is a connection in which a stateful service is located; a processing unit, configured to: when a preset condition is met, process, based on a context of the first connection, a plurality of packets coalesced in the first queue to obtain a second packet, where the context of the first connection is an updated context obtained after a previous second packet of the first connection is obtained; and a transmitting unit, configured to transmit the second packet to the host.

In a possible implementation of the second aspect, the coalescing message of the first packet includes at least one of the following: an identifier of the first connection, a function identifier, and metadata.

In a possible implementation of the second aspect, the coalescing unit is further configured to: when the coalescing message of the first packet meets a coalescing context of the first queue, coalesce the first packet to an X chain of the first queue as a coalescing node, where the coalescing context of the first queue indicates a coalescing message of the first queue.

In a possible implementation of the second aspect, the coalescing unit is further configured to: when the coalescing message of the first packet does not meet the coalescing context of the first queue, coalesce the first packet to a Y chain of the first queue as a basic node, and update the coalescing context of the first queue based on the coalescing message of the first packet.

In a possible implementation of the second aspect, the processing unit is further configured to edit and chain a plurality of packets that belong to a same X chain in the first queue.

In a possible implementation of the second aspect, the preset condition includes any one of the following: coalescing duration reaches specified duration, a quantity of coalesced packets reaches a preset threshold, and a volume of coalesced data reaches a preset data volume.

In a possible implementation of the second aspect, the apparatus further includes a bandwidth provision unit, configured to provide a receive bandwidth for the first queue from an available bus bandwidth; and correspondingly, the transmitting unit is further configured to transmit the second packet to the host by using the receive bandwidth.

According to still another aspect, a stateful service processing apparatus is provided, where the apparatus is a network interface card or a chip built in a network interface card. The apparatus includes a memory and a processor coupled to the memory, where the memory stores code and data, and the processor runs the code in the memory, to enable the apparatus to perform the stateful service processing method provided in the first aspect or any possible implementation of the first aspect.

According to still another aspect, a communication system is provided. The communication system includes a network interface card and a host, where the network interface card is connected to the host by using a bus. The network interface card is the network interface card provided in any one of the foregoing aspects and is configured to perform the stateful service processing method provided in the first aspect or any possible implementation of the first aspect.

According to still another aspect, a computer-readable storage medium is provided, where the computer-readable storage medium stores instructions, and when the instructions are run on a computer, the computer is enabled to perform the stateful service processing method provided in the first aspect or any possible implementation of the first aspect.

According to still another aspect, a computer program product is provided. The computer program product includes computer executable instructions, where the computer executable instructions are stored in a computer-readable storage medium. At least one processor of a device may read the computer executable instructions from the computer-readable storage medium, and the at least one processor executes the computer executable instructions, to enable the device to perform the stateful service processing method provided in the first aspect or any possible implementation of the first aspect.

It may be understood that any one of the stateful service processing apparatus, the computer storage medium, or the computer program product provided above is configured to perform the corresponding method provided above. Therefore, for beneficial effects that can be achieved by any one of the stateful service processing apparatus, the computer storage medium, or the computer program product, refer to the beneficial effects in the corresponding method provided above. Details are not described herein again.

DETAILED DESCRIPTION OF THE EMBODIMENTS

"At least one" means one or more, and "a plurality of" means two or more. "And/or" describes an association relationship between associated objects and represents that three relationships may exist. For example, A and/or B may represent the following cases: only A exists, both A and B exist, and only B exists, where A and B may be singular or plural. The character "/" usually indicates an "or" relationship between associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural. In addition, the words such as "first" and "second" used in the embodiments are used to distinguish between the same or similar items with basically the same functions and effects. For example, a first threshold and a second threshold are merely used to distinguish between different thresholds and do not limit a sequence thereof. A person skilled in the art may understand that the words such as "first" and "second" do not limit a quantity and an execution order.

It should be noted that, in the embodiments, the term such as "example" or "for example" is used to represent giving an example, an illustration, or descriptions. Any embodiment described as an "example" or "for example" in embodiments should not be explained as being more preferred or having more advantages than another embodiment. Exactly, use of the word "example", "for example", or the like is intended to present a related concept.

Figure 1:
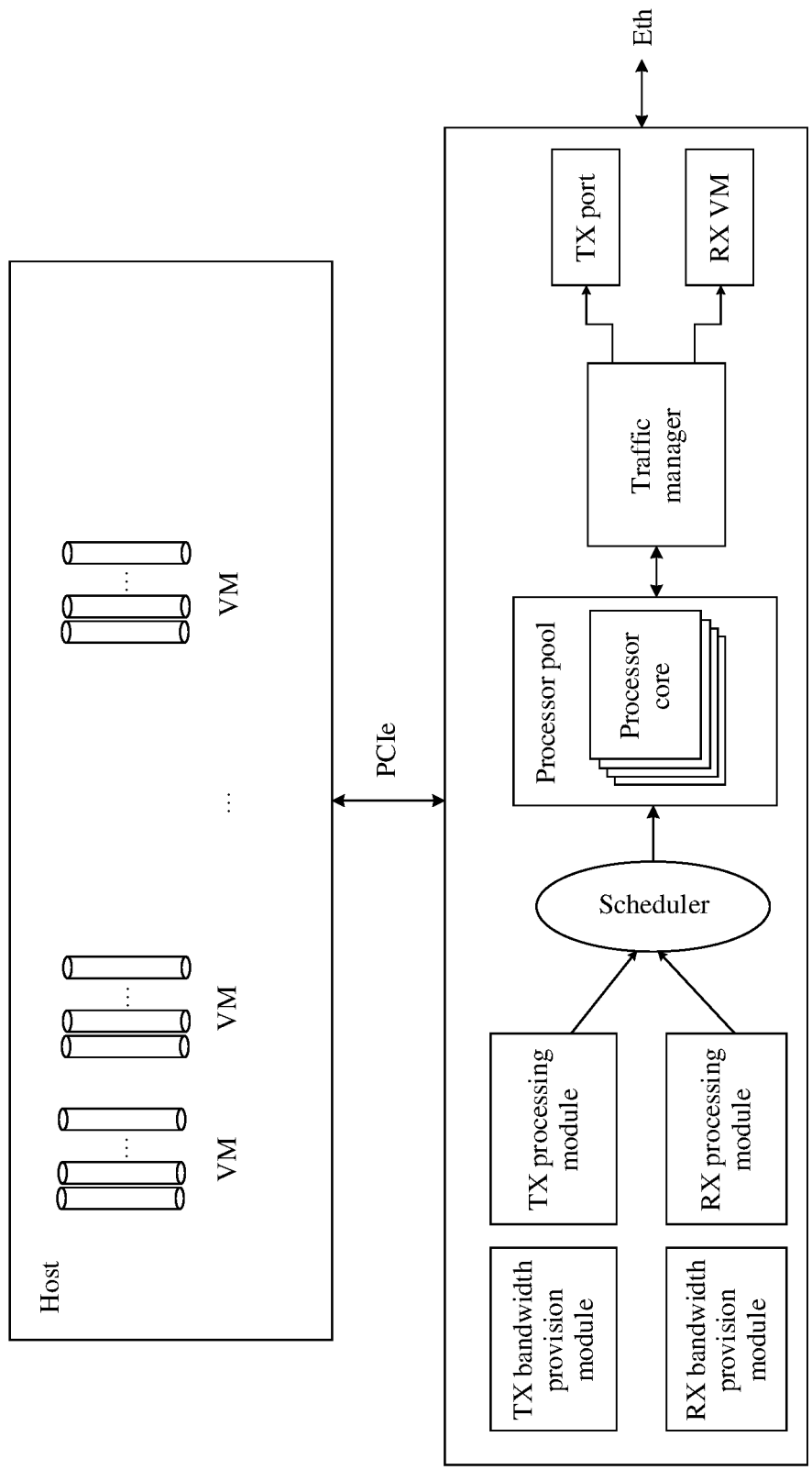
FIG. 1 is a schematic diagram of a structure of a communication system according to an embodiment.

FIG. 1 is a schematic diagram of a structure of a communication system according to an embodiment. The communication system includes a host and a network interface card, where the host is connected to the network interface card by using a bus. For example, the network interface card is a smart network interface card (NIC), and the smart network interface card is connected to the host by using a peripheral component interconnect express (PCIe) bus. Optionally, the communication system may include one or more hosts, and the one or more hosts may be connected to the smart network interface card. The following describes the embodiments by using an example in which the network interface card is a smart network interface card.

A plurality of virtual machines (VM) are disposed in the host. Each VM can run one or more virtual functions (VF). The one or more VFs may correspond to different functions. Each VF may correspond to one or more queues, and an input or output mechanism of the VF is implemented by using the one or more queues. The plurality of queues may include a transmitting queue and a receiving queue. The smart network interface card may be configured to process various network protocols or storage protocols separated from the host. This may also be referred to as protocol offload. For example, network offload may include: virtualization I/O (Virt IO) offload, single-root I/O virtualization (SR-IOV) offload, user datagram protocol (UDP)/transmission control protocol (TCP)/Internet protocol (IP) checksum (CS) offload, receive side scaling (RSS) offload/TCP segment offload (TSO)/large receive offload (LRO), virtual extensible local area network (VxLAN)/generic network virtualization encapsulation (Geneve) offload, stateful open virtual switch (OVS) offload, IP security (IPSec) offload, TCP offload (TOE) offload, remote DMA over converged Ethernet version 2 (RoCEv2) offload, and the like. Storage offload may include: erasure coding (EC) offload, virtual block service (VBS) offload, T10 data integrity field (DIF)/data integrity extension (DIX) offload, fiber channel (FC) offload, non volatile memory express (NVMe) offload, non volatile memory express over fabric (NoF) offload, and the like.

In addition, when the smart network interface card receives a packet transmitted to the host by an Ethernet (Eth), the smart network interface card may process the packet, and transmit a processed packet to the host. In a possible embodiment, the smart network interface card may include: a transmit (TX) bandwidth provision module, a receive (RX) bandwidth provision module, a transmit (TX) processing module, a receive (RX) processing module, a scheduler, a processor pool including a plurality of processor cores, a traffic manager, a transmit (TX) port configured to transmit a packet to the Eth, and a receive virtual machine (RX VM) configured to transmit a packet to the host. Optionally, the processor pool in the smart network interface card may be an application-specific integrated circuit (ASIC), a field programmable gate array (FPGA), or the like. This is not limited in the embodiments.

Figure 2:
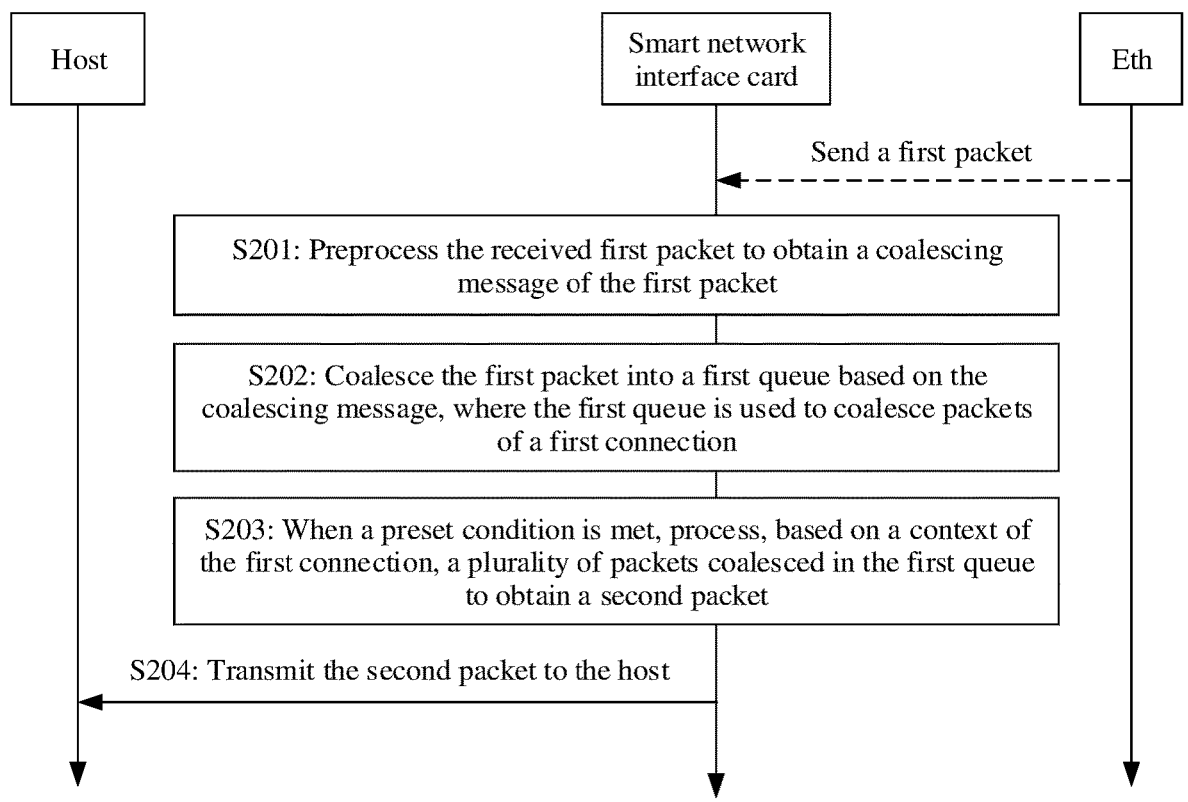
FIG. 2 is a schematic flowchart of a stateful service processing method according to an embodiment.

FIG. 2 is a schematic flowchart of a stateful service processing method according to an embodiment. The method may be applied to the communication system that includes the host and the smart network interface card and that is shown in FIG. 1. The method includes the following several steps:

S201: The smart network interface card preprocesses a received first packet to obtain a coalescing message of the first packet.

One or more connections may be established between the host and a network (Eth) by using the smart network interface card. The connection may refer to a logical link established between sessions of two ends. For example, the connection may include a TCP connection, a UDP connection, or an ROCE queue pair (QP) connection. A first connection may be any one of the one or more connections, an identifier of the first connection may be used to identify the first connection, and the first connection may be a connection in which a stateful service is located. When the network needs to transmit a packet of the first connection to the host, the network may transmit the packet of the first connection to the smart network interface card. Subsequently, the smart network interface card processes the packet of the first connection and transmits a processed packet to the host.

In addition, the stateful service corresponds to a stateless service. The stateless service may be that a single packet of the service can be processed based on a header of the packet, and there is no association between packets. The stateful service may be that how to process a single packet of the service cannot be determined by the packet. Processing of the packet needs to depend on a state of a "connection" in which the packet is located, information about the packet, and the like. In this way, a processing behavior of the packet can be determined. That is, there is an association between packets in the stateful service. State information of the "connection" includes, but is not limited to: a sequence number of a next expected packet, an acknowledged (ACK) sequence number, and receiver window updating and statistical information. For ease of understanding, the following uses a firewall as an example to describe a stateful firewall and a stateless firewall. The firewall herein may include a firewall or may include a firewall at a different level, for example, a security group in OpenStack. The stateless firewall is used to filter or block a network data packet based on a static value, for example, based on an address, a port, or a protocol. In other words, the stateless firewall does not care about a current network connection state. The stateful firewall may distinguish a network connection state. For example, the stateful firewall may distinguish a TCP connection and a current stage of the TCP connection. In other words, in addition to a static value, the stateful firewall can further filter or block a network data packet based on a connection state.

In this embodiment, when the smart network interface card receives the first packet from the network, the smart network interface card may preprocess the first packet. For example, the smart network interface card may parse a header of the first packet, to obtain the coalescing message of the first packet. The coalescing message may include one or more identifier of the first connection to which the first packet belongs, a function identifier corresponding to the first connection, and metadata. For example, the function identifier corresponding to the first connection is an identifier of a first VF, the first VF may be a VF used to receive a packet of the first connection, and the identifier of the first VF may be used to uniquely identify the first VF in a plurality of VFs in the host. The metadata may include a quintet of a packet, a message type of a packet, operation code indicating a message type of a packet, or the like.

For example, when the first connection is a TCP connection, the coalescing message may include metadata, and the metadata may include a quintet, a TCP sequence number (SN), and the like. For another example, when the first connection is a remote direct memory access (RDMA) connection, the coalescing message may include metadata, and the metadata may include operation code indicating a message type of a packet. For example, the operation code may include send first, send middle, or send last, or the operation code may include write first, write middle, or write last.

S202: The smart network interface card coalesces the first packet into a first queue based on the coalescing message, where the first queue is used to coalesce packets of the first connection.

A plurality of queues may be set in the smart network interface card. Each queue in the plurality of queues may be used to coalesce a plurality of packets from the network. The plurality of packets may belong to a same connection, may belong to a same message type of a same connection (for example, message types of the plurality of packets may all be write data), or may belong to a plurality of consecutive packets (for example, packet numbers of the plurality of packets are consecutive) in a same message type of a same connection. The first queue may be any queue in the plurality of queues that is used to coalesce the packets of the first connection.

When the smart network interface card obtains the coalescing message of the first packet, the smart network interface card may determine whether the coalescing message meets a coalescing context of the first queue, where the coalescing context of the first queue indicates a coalescing message of the first queue. For example, the coalescing context of the first queue may include an identifier of the first connection, an identifier of the first VF, a quintet of a packet, a message type of the packet, operation code of the packet, a quantity of coalesced packets, and a data volume of the coalesced packets. When the coalescing message meets the coalescing context of the first queue, the smart network interface card may coalesce the first packet to an X chain of the first queue as a coalescing node, and the first queue is a queue in which the packets of the first connection are coalesced. Further, the smart network interface card may further update the coalescing context of the first queue, for example, the quantity of coalesced packets in the coalescing context of the first queue is increased by 1. When the coalescing message does not meet the coalescing context of the first queue, the smart network interface card may coalesce the first packet to a Y chain of the first queue as a basic node and update the coalescing context of the first queue based on the coalescing message. An updated coalescing context indicates a current coalescing message in the first queue. For example, a message type of a packet in the updated coalescing context is updated to a message type of the first packet, quintet information of the packet is updated to quintet information of the first packet, and the quantity of coalesced packets is updated to 1.

It should be noted that if the first queue is empty, the first packet may be coalesced to the Y chain of the first queue, and the coalescing message of the first queue is generated based on the coalescing message of the first packet. For example, the identifier of the first connection and the message type of the packet in the coalescing message of the first packet are extracted as an identifier of a connection and a message type of a coalesced packet in the coalescing context of the first queue.

Figure 3:
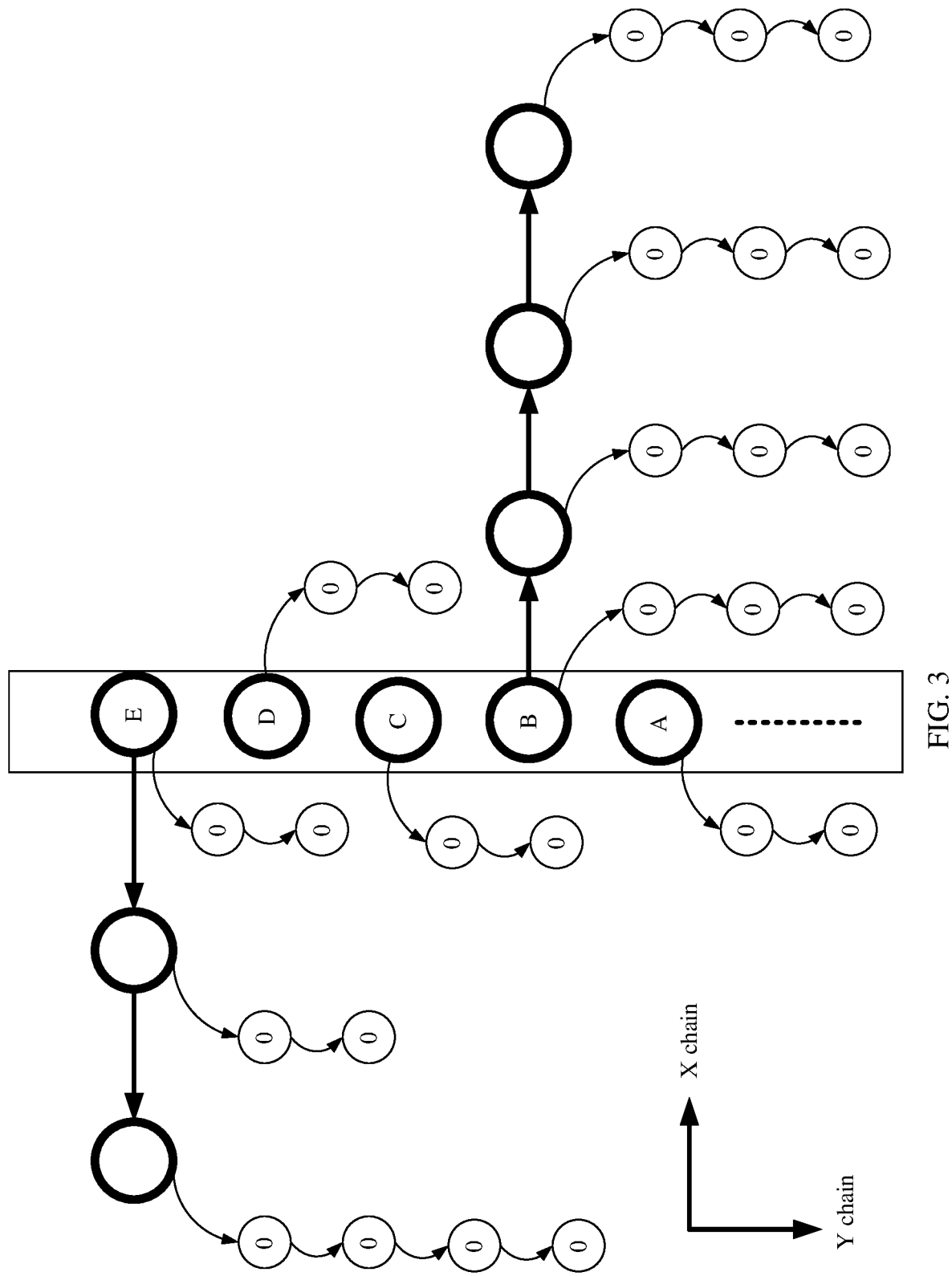
FIG. 3 is a schematic diagram of packet coalescing according to an embodiment.

For example, as shown in FIG. 3, an example in which the smart network interface card receives a plurality of packets from the network and the plurality of packets belong to a plurality of different connections is used for description. In FIG. 3, the plurality of packets may include 10 packets. The 10 packets may belong to five different connections. A packet A, a packet B, a packet C, a packet D, and a packet E in the 10 packets are respectively first packets successively corresponding to the five connections. Therefore, the packet A, the packet B, the packet C, the packet D, and the packet E are separately located on the Y chain of the first queue as basic nodes. In addition, another three packets in the 10 packets correspond to the same connection as the packet B, and are received after the packet B and before the packet A. In this way, the three packets are coalesced together with the packet B to the X chain of the first queue. The remaining two packets in the 10 packets correspond to the same connection as the packet E, and are received after the packet E and before the packet D. In this way, the two packets are coalesced together with the packet E to another X chain of the first queue. In FIG. 3, a cell chain included in each packet is represented by small circles with a number 0.

It should be noted that the packet A, the packet B, the packet C, the packet D, and the packet E shown in FIG. 3 may be alternatively packets of different message types of a same connection, or packets that are of a same message type of a same connection and that have unexpected packet numbers. The foregoing merely uses an example in which the packet A, the packet B, the packet C, the packet D, and the packet E belong to a plurality of different connections for description. This does not constitute a limitation on this embodiment.

It should be noted that different coalescing policies may exist for different protocol types. For example, for an ROCE protocol, only packets of a same message type may be coalesced. For example, there are four packets: write first, write middle, write middle, and write middle. Operation code obtained after the packets are coalesced may be write first. For another example, there are four packets: write middle, write middle, write middle, and write middle. Operation code obtained after the packets are coalesced may be write middle. For another example, there are four packets: write middle, write middle, write middle, and write last. Operation code obtained after the packets are coalesced may be write last.

S203: When a preset condition is met, the smart network interface card processes, based on a context of the first connection, a plurality of packets coalesced in the first queue to obtain a second packet.

The preset condition may include any one of the following: coalescing duration reaches specified duration, a quantity of coalesced packets reaches a preset threshold, and a volume of coalesced data reaches a preset data volume. It should be noted that the coalescing duration, the preset threshold, and the preset data volume may be preset, and values of the coalescing duration, the preset threshold, and the preset data volume may be fixed or variable. The coalescing duration, the preset threshold, and the preset data volume may be set by a person skilled in the art based on experience or an actual situation. For example, the preset data volume may be 64 KB. This is not limited in this embodiment.

When the preset condition is met, the smart network interface card may process, based on the context of the first connection, the plurality of packets coalesced in the first queue, for example, perform L4 and L4+ processing on the plurality of packets based on the context of the first connection, and edit and chain a plurality of packets that belong to a same X chain in the first queue, to obtain the second packet. A cache of the smart network interface card may store the context of the first connection or may not store the context of the first connection. When the smart network interface card does not store the context of the first connection, the smart network interface card may obtain the context of the first connection from the host based on the identifier of the first connection. When the smart network interface card stores the context of the first connection, the smart network interface card may obtain the context of the first connection from the cache of the smart network interface card. In addition, the context of the first connection is an updated context obtained after a previous second packet of the first connection is obtained.

S204: The smart network interface card transmits the second packet to the host.

When the smart network interface card obtains the second packet, the smart network interface card can transmit the second packet to the host by using the PCIe bus, so that the host can receive the second packet, that is, receive a plurality of packets of the first connection. Optionally, when the first VF in a first VM in the host is used to store the packets of the first connection, the host may further store the received second packet in the first VF of the first VM, where the first VM is a VM that runs the first VF in a plurality of VMs of the host.

Further, before transmitting the second packet to the host, the smart network interface card provides a receive bandwidth for the first queue from an available bus bandwidth (for example, an available bus bandwidth corresponding to the PCIe bus), to transmit the second packet to the host by using the receive bandwidth. It should be noted that the receive bandwidth may be fixed or variable and may be set by a person skilled in the art based on experience or an actual situation. For example, the preset data volume may be 64 KB. This is not limited in this embodiment.

Figure 4:
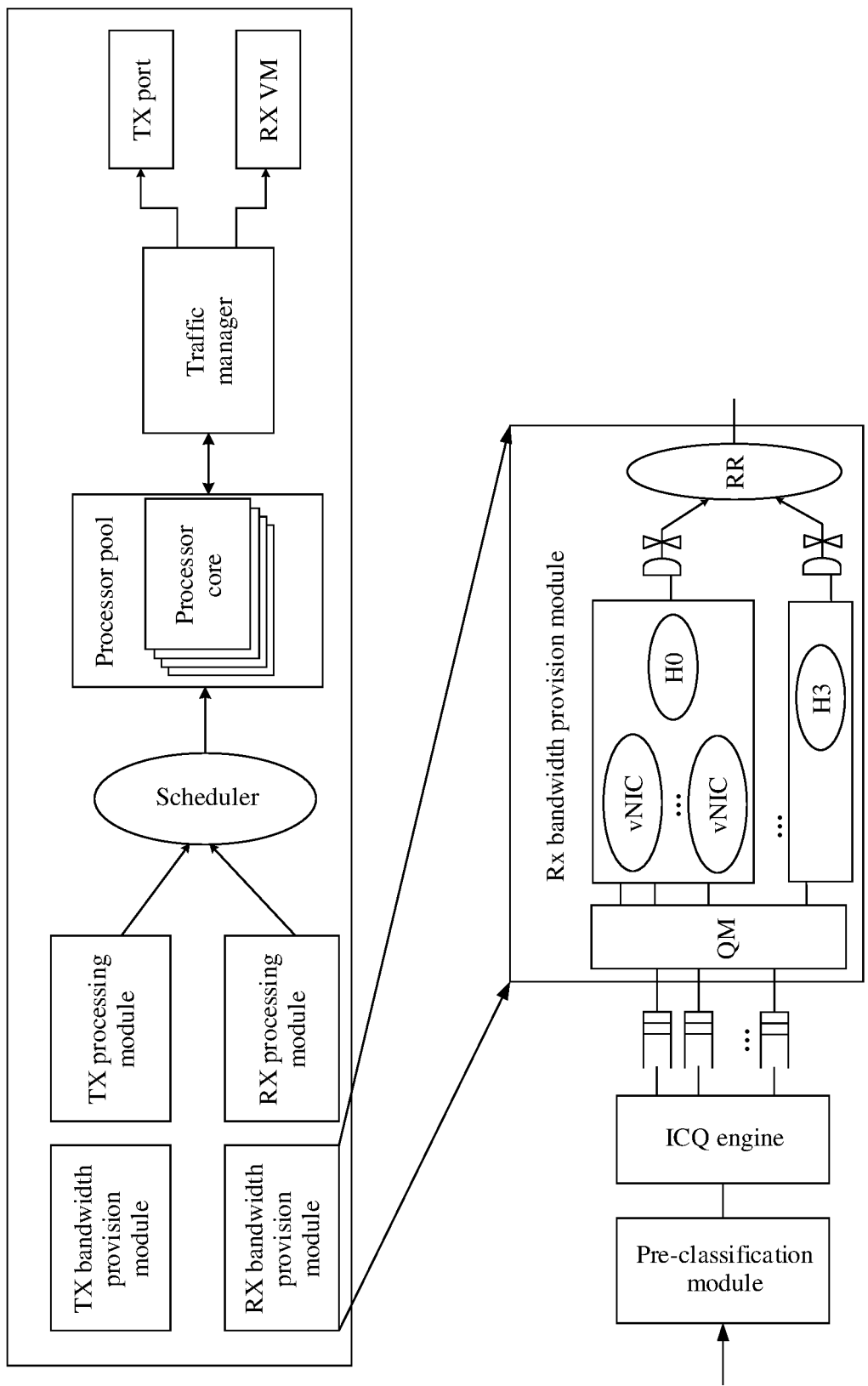
FIG. 4 is a schematic diagram of a structure of a smart network interface card according to an embodiment.

For ease of understanding, the following uses a structure of the smart network interface card shown in FIG. 4 as an example to describe the solution provided in this embodiment.

The smart network interface card further includes a pre-classification module and an input coalescing queue (ICQ) engine. The RX bandwidth provision module may include a queue mapping (QM) module, bandwidth provision nodes (represented as vNIC in FIG. 4), and a round robin (RR) scheduling scheduler (represented as RR in FIG. 4). In FIG. 4, an example in which the smart network interface card is connected to a plurality of hosts (for example, H0 to H3) is used for description.

When the smart network interface card receives the first packet, the pre-classification module preprocesses the first packet to obtain the coalescing message of the first packet, for example, the identifier of the first connection, the VF ID, and the message type. The ICQ engine coalesces the first packet into the first queue based on the coalescing message. When the preset condition is met, the queue mapping module maps the first queue to a corresponding bandwidth provision node to complete provision of the receive bandwidth. Then the RR provides a processor core or a thread in a processor core for the first queue from the processor pool, and the provided processor core or thread may be referred to as a core/thread hereinafter. The core/thread may obtain the context of the first connection based on the identifier of the first connection, and process, based on the context of the first connection, the plurality of packets coalesced in the first queue, so that the obtained second packet can be stored in a memory of the smart network interface card. The traffic manager may schedule the second packet from the memory and transmit the second packet to the host by using the PCIe bus.

Figure 5:
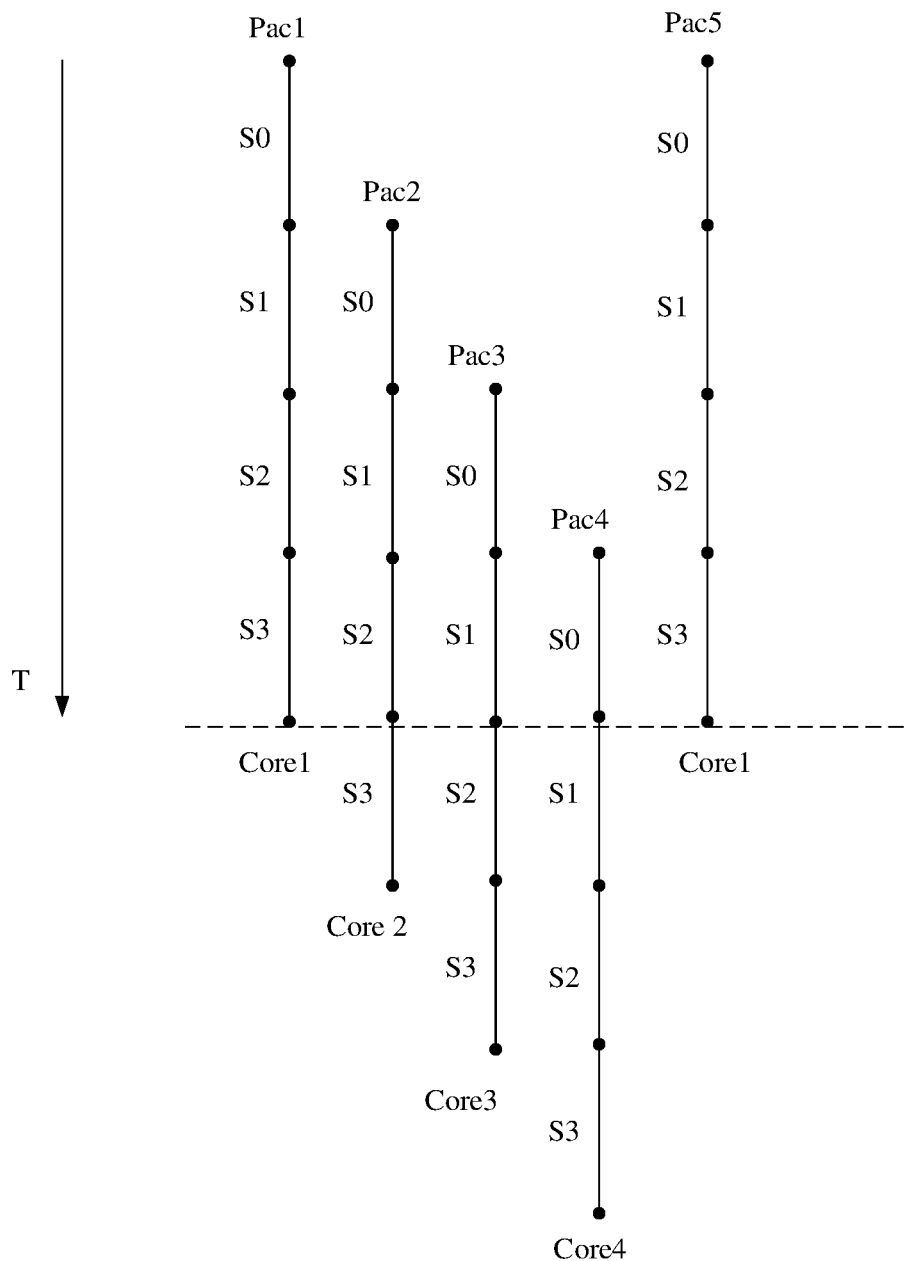
FIG. 5 is a schematic diagram of multi-packet processing according to an embodiment.

Further, the context of the first connection may be decomposed into a plurality of sub-contexts, so that different processor cores or threads of the smart network interface card concurrently process different packets of a same connection based on different sub-contexts, thereby improving throughput of the packets of the first connection. For example, as shown in FIG. 5, the context of the first connection may be decomposed into four sub-contexts, which are respectively represented as S0, S1, S2, and S3. In this way, the smart network interface card can simultaneously process packets coalesced in four coalescing queues corresponding to the first connection, and the packets coalesced in the four coalescing queues may be respectively represented as pac1, pac2, pac3, and pac4. It is assumed that processor cores provided by the scheduler for the four packets are respectively Core1, Core2, Core3, and Core4. After the Core1 completes processing of pac1 S0, the Core1 may continue processing of pac1 S1. In this case, the Core2 may perform processing of pac2 S0. After the Core1 completes processing of pac1 S1, the Core1 may continue processing of pac1 S2. In this case, the Core2 completes processing of pac2 S0 and may start to perform processing of pac2 S1. At the same time, the Core3 may start to perform processing of pac3 S0, . . . , and so on. Further, if the first connection further corresponds to pac5, after the Core1 completes processing of pac1 S3, the Core1 may start to perform processing of pac5 S0, the Core2 starts to perform processing of pac2 S3, the Core3 starts to perform processing of pac3 S2, and the Core4 starts to perform processing of pac4 S1. In this way, the four cores of the smart network interface card can concurrently participate in context processing of the first connection, and each core can process a second packet of one first connection, thereby improving the throughput of the packets of the first connection.

In this embodiment, the smart network interface card can preprocess the received first packet, to obtain the coalescing message of the first packet, and coalesce, based on the coalescing message, the first packet into the first queue used to coalesce the packets of the first connection, so that when the preset condition is met, the plurality of packets coalesced in the first queue are processed based on the context of the first connection, to obtain the second packet. In this way, the smart network interface card can obtain the context of the first connection only once and process the plurality of packets of the first connection based on the context, thereby improving processing performance of a single stateful service.

The foregoing describes the solutions provided in the embodiments from the perspective of interaction between devices. It may be understood that the various devices are, for example, the host and the smart network interface card. To implement the foregoing functions, corresponding hardware structures and/or software modules for performing the functions are included. A person skilled in the art should be easily aware that units, algorithms, and steps in the examples described with reference to embodiments can be implemented in a form of hardware or a combination of hardware and computer software. Whether a function is performed by hardware or hardware driven by computer software depends on a particular application. A person skilled in the art may use different methods to implement the described functions for each particular application, but it should not be considered that the implementation goes beyond the scope of the embodiments.

In this embodiment, the smart network interface card may be divided into functional modules based on the foregoing method examples. For example, each functional module may be obtained through division corresponding to each function, or two or more functions may be integrated into one module. The integrated module may be implemented in a form of hardware or may be implemented in a form of a software functional module. It should be noted that, in the embodiments, division into the modules is an example and is merely logical function division and may be other division in an actual implementation. The following uses an example in which each functional module is obtained through division corresponding to each function for description.

Figure 6:
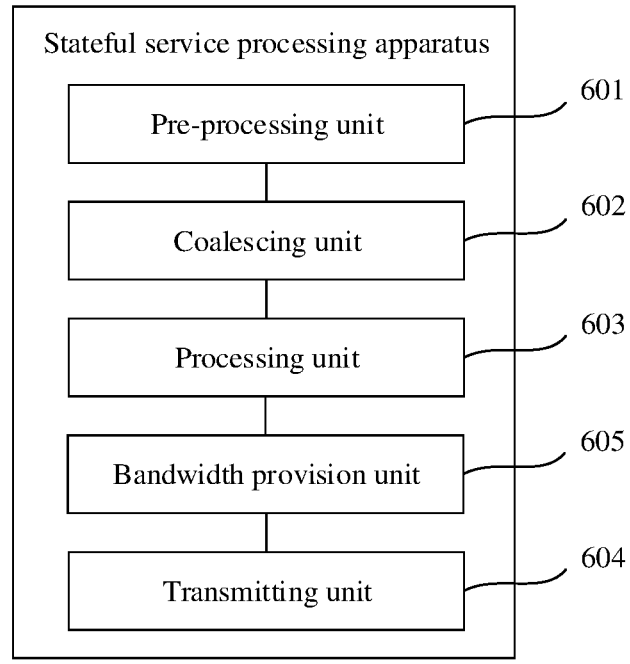
FIG. 6 is a schematic diagram of a structure of a stateful service processing apparatus according to an embodiment.

When an integrated unit is used, FIG. 6 is a schematic diagram of a possible structure of a stateful service processing apparatus in the foregoing embodiment. The apparatus may be a smart network interface card or a chip built in a smart network interface card. The apparatus includes a preprocessing unit 601, a coalescing unit 602, a processing unit 603, and a transmitting unit 604. The preprocessing unit 601 is configured to support the apparatus in performing S201 in the foregoing method embodiment. The coalescing unit 602 is configured to support the apparatus in performing S202 in the foregoing method embodiment. The processing unit 603 is configured to support the apparatus in performing S203 in the foregoing method embodiment. The transmitting unit 604 is configured to support the apparatus in performing S204 in the foregoing method embodiment. Further, the apparatus may further include a bandwidth provision unit 605, configured to support the apparatus in performing the step of providing the receive bandwidth in the foregoing method embodiment.

In an actual application, the preprocessing unit 601 may be the pre-classification module in the smart network interface card described in the foregoing method embodiment. The coalescing unit 602 may be the ICQ engine in the smart network interface card described in the foregoing method embodiment. The processing unit 603 may be the processor pool in the smart network interface card described in the foregoing method embodiment. The transmitting unit 604 may be the RV VM in the smart network interface card described in the foregoing method embodiment. The bandwidth provision unit 605 may be the RX bandwidth provision module in the smart network interface card described in the foregoing method embodiment.

It should be noted that all related content of the steps in the foregoing method embodiment may be cited in function descriptions of corresponding functional modules. For details, refer to the descriptions in the foregoing method embodiment. Details are not described herein in this embodiment again.

Based on an implementation by using hardware, the preprocessing unit 601, the coalescing unit 602, and the processing unit 603 may be integrated as a processor of the apparatus, and the transmitting unit 604 may be used as a communication interface of the apparatus.

Figure 7:
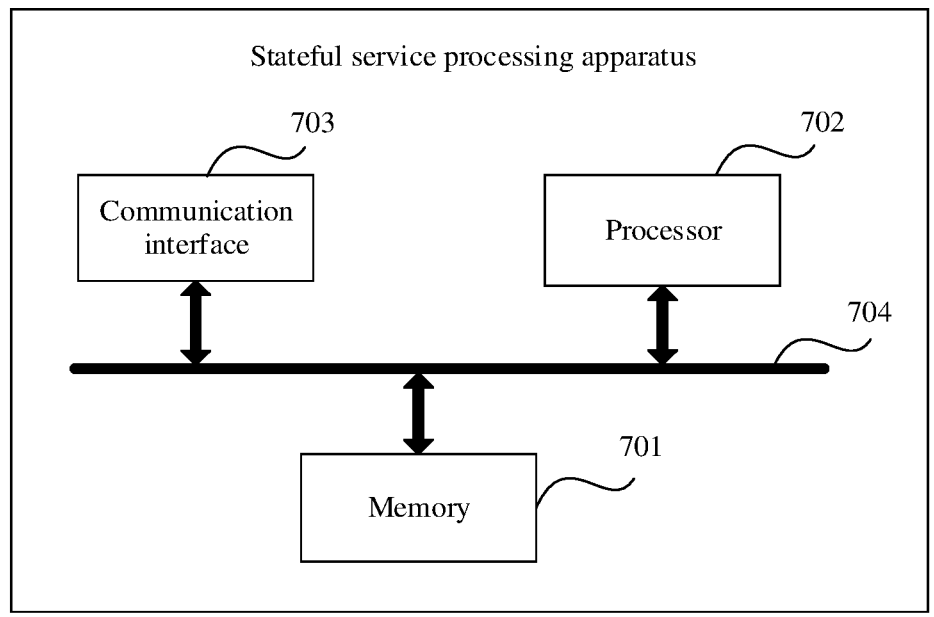
FIG. 7 is a schematic diagram of a structure of another stateful service processing apparatus according to an embodiment.

FIG. 7 is a schematic diagram of a possible logical structure of a stateful service processing apparatus related to the foregoing embodiment according to an embodiment. The apparatus may be a smart network interface card or a chip built in a smart network interface card, and the apparatus includes a processor 702 and a communication interface 703. The processor 702 is configured to control and manage an action of the apparatus. For example, the processor 702 is configured to support the apparatus in performing S201, S202, and S203 in the foregoing method embodiment, and/or is configured to perform another process of the technology described herein. In addition, the apparatus may further include a memory 701 and a bus 704. The processor 702, the communication interface 703, and the memory 701 are connected to each other by using the bus 704. The communication interface 703 is configured to support the apparatus in communication, for example, support the apparatus in communicating with a host. The memory 701 is configured to store program code and data of the apparatus.

The processor 702 may be a central processing unit, a general-purpose processor, a digital signal processor, an application-specific integrated circuit, a field programmable gate array or another programmable logic device, a transistor logic device, a hardware component, or any combination thereof. The processor 702 may implement or execute logical blocks, modules, and circuits in various examples. The processor may be alternatively a combination for implementing a computing function, for example, a combination including one or more microprocessors, or a combination of a digital signal processor and a microprocessor. The bus 704 may be a peripheral component interconnect (PCI) bus, an extended industry standard architecture (EISA) bus, or the like. The bus 704 may be classified into an address bus, a data bus, a control bus, and the like. For ease of representation, only one bold line is used for representation in FIG. 7, but this does not mean that there is only one bus or only one type of bus.

In still another aspect, a communication system is provided, where the communication system includes a network interface card and a host, and the network interface card is connected to the host by using a bus. The network interface card is any network interface card provided above and is configured to perform the steps performed by the network interface card in the foregoing method embodiment.

In the several embodiments, it should be understood that the apparatuses and methods may be implemented in other manners. For example, the described apparatus embodiments are merely examples. For example, division into the modules or units is merely logical function division and may be other division in an actual implementation. For example, a plurality of units or components may be combined or may be integrated into another apparatus, or some features may be ignored or not performed.

The units described as separate parts may or may not be physically separate, and parts displayed as units may be one or more physical units, that is, may be located in one place, or may be distributed in a plurality of different places. Some or all of the units may be selected based on an actual requirement to achieve the objectives of the solutions of embodiments.

In addition, functional units in the embodiments may be integrated into one processing unit, each of the units may exist alone physically, or two or more units may be integrated into one unit. The integrated unit may be implemented in a form of hardware or may be implemented in a form of a software function unit.

If the integrated unit is implemented in a form of a software functional unit and is sold or used as an independent product, the integrated unit may be stored in a non-transitory readable storage medium. The non-transitory readable storage medium may include any medium that can store program code, for example, a USB flash drive, a removable hard disk, a read-only memory, a random access memory, a magnetic disk, or an optical disc. Based on such an understanding, the embodiments may be embodied in a form of a software product.

In another embodiment, a non-transitory readable storage medium is further provided. The non-transitory readable storage medium stores computer executable instructions. When a device (which may be a single-chip microcomputer, a chip, or the like) or a processor performs the stateful service processing method provided in the foregoing method embodiment.

In another embodiment, a computer program product is further provided. The computer program product includes computer executable instructions, where the computer executable instructions are stored in a non-transitory computer-readable storage medium. At least one processor of a device may read the computer executable instructions from the non-transitory computer-readable storage medium, and the at least one processor executes the computer executable instructions, to enable the device to perform the stateful service processing method provided in the foregoing method embodiment.

In conclusion, the foregoing descriptions are merely embodiments, but are not intended to limit the scope of the embodiments. Any variation or replacement shall fall within the scope of the embodiments.

What is claimed is:

1. A stateful service processing method, the method applied to a network interface card, and the network interface card is connected to a host, the method comprising:
preprocessing a received first packet to obtain a coalescing message of the first packet;
coalescing the first packet into a first queue based on the coalescing message of the first packet, wherein the first queue is used to coalesce packets of a first connection to which the first packet belongs and the first connection is a connection in which a stateful service is located;
wherein coalescing the first packet into the first queue based on the coalescing message of the first packet further comprises:
when the coalescing message of the first packet does not meet the coalescing context of the first queue:
coalescing the first packet to a Y chain of the first queue as a basic node; and updating the coalescing context of the first queue based on the coalescing message of the first packet;
when a preset condition is met, processing, based on a context of the first connection, a plurality of packets coalesced in the first queue to obtain a second packet, wherein the context of the first connection indicates related information of the first connection and the context of the first connection is an updated context obtained after a previous second packet of the first connection is obtained; and
transmitting the second packet to the host.

2. The stateful service processing method according to claim 1, wherein the coalescing message of the first packet comprises at least one of the following: an identifier of the first connection, a function identifier, and metadata.

3. The stateful service processing method according to claim 1, wherein coalescing the first packet into the first queue based on the coalescing message of the first packet further comprises:
when the coalescing message of the first packet meets a coalescing context of the first queue, coalescing the first packet to an X chain of the first queue as a coalescing node, wherein the coalescing context of the first queue indicates a coalescing message of the first queue.

4. The stateful service processing method according to claim 1, wherein processing the plurality of packets in the first queue further comprises:
  editing and chaining a plurality of packets that belong to a same X chain in the first queue.

5. The stateful service processing method according to claim 1, wherein the preset condition comprises any one of the following: coalescing duration reaches specified duration, a quantity of coalesced packets reaches a preset threshold, and a volume of coalesced data reaches a preset data volume.

6. The stateful service processing method according to claim 1, further comprising:
  providing a receive bandwidth for the first queue from an available bus bandwidth; and
  transmitting the second packet to the host by using the receive bandwidth.

7. A stateful service processing apparatus, the apparatus applied to a network interface card, and the network interface card is connected to a host, the apparatus comprising:
  a preprocessor unit, configured to preprocess a received first packet to obtain a coalescing message of the first packet;
  a coalescing unit, configured to coalesce the first packet into a first queue based on the coalescing message of the first packet, wherein the first queue is used to coalesce packets of a first connection to which the first packet belongs and the first connection is a connection in which a stateful service is located;
  wherein the coalescing unit is further configured to:
  when the coalescing message of the first packet does not meet the coalescing context of the first queue:
  coalesce the first packet to a Y chain of the first queue as a basic node: and update the coalescing context of the first queue based on the coalescing message of the first packet;
  a processing unit, configured to: when a preset condition is met, process, based on a context of the first connection, a plurality of packets coalesced in the first queue to obtain a second packet, wherein the context of the first connection indicates related information of the first connection and the context of the first connection is an updated context obtained after a previous second packet of the first connection is obtained; and
  a transmitting unit, configured to transmit the second packet to the host.

8. The stateful service processing apparatus according to claim 7,
  wherein the coalescing message of the first packet comprises at least one of the following: an identifier of the first connection, a function identifier, and metadata.

9. The stateful service processing apparatus according to claim 7, wherein the coalescing unit is further configured to:
  when the coalescing message of the first packet meets a coalescing context of the first queue, coalesce the first packet to an X chain of the first queue as a coalescing node, wherein the coalescing context of the first queue indicates a coalescing message of the first queue.

10. The stateful service processing apparatus according to claim 7, wherein the processing unit is further configured to:
  edit and chain a plurality of packets that belong to a same X chain in the first queue.

11. The stateful service processing apparatus according to claim 7, wherein the preset condition comprises any one of the following: coalescing duration reaches specified duration, a quantity of coalesced packets reaches a preset threshold, and a volume of coalesced data reaches a preset data volume.

12. The stateful service processing apparatus according to claim 7, further comprising:
  a bandwidth provision unit, configured to provide a receive bandwidth for the first queue from an available bus bandwidth, wherein the transmitting unit is further configured to transmit the second packet to the host by using the receive bandwidth.

13. A non-transitory computer-readable storage medium, wherein the non-transitory computer-readable storage medium stores instructions, and when the instructions are run on a computer, the computer is enabled to perform the stateful service processing method according to claim 1.

* * * * *